United States Patent [19]

Knapp et al.

[11] Patent Number: 4,600,629

[45] Date of Patent: Jul. 15, 1986

[54] SELECTIVELY ABSORBENT MASK PRINTING PROCESS

[75] Inventors: David H. Knapp, Westfield; Robert E. Lafler, Charlton City, both of Mass.

[73] Assignee: Westvaco Corporation, New York, N.Y.

[21] Appl. No.: 776,600

[22] Filed: Sep. 16, 1985

[51] Int. Cl.[4] .......................... B32B 29/06; B05D 5/06

[52] U.S. Cl. ..................................... 428/201; 427/161; 427/259; 427/288; 428/207; 428/211; 428/918

[58] Field of Search ............... 427/258, 259, 265, 161, 427/288; 428/201, 211, 207, 918

[56] References Cited

U.S. PATENT DOCUMENTS

| | | | |
|---|---|---|---|
| 3,085,898 | 4/1963 | Vaurio | 428/211 |
| 3,140,959 | 7/1964 | Vaurio | 428/211 |
| 3,288,628 | 11/1966 | Schur et al. | 428/211 |

*Primary Examiner*—Evan K. Lawrence
*Attorney, Agent, or Firm*—W. A. Marcontell; R. L. Schmalz

[57] ABSTRACT

The present printing process provides a unique color tone print of muted contrast in two, sequentially operated, flexographic print stations. A suitable paper substrate base for the process is uncoated white paper of stationery or envelope grade. As the paper supply web is drawn through the first print station, the desired image or design is printed on the paper with a colorless solution of a polyol, such as glycerine, in a glycol ether solvent. The second print station simply lays a uniform color coating of compatible pigment or solvent dye based ink over the entire web surface. Shade or tone differences resulting from differences in ink absorption with respect to the glycerine solution image areas provide a distinctive printed product.

10 Claims, No Drawings

SELECTIVELY ABSORBENT MASK PRINTING PROCESS

BACKGROUND OF THE INVENTION

1. Field of the Invention

The present invention relates to flexographic printing processes. More particularly, the invention relates to a process of mask printing whereby a desired image is first printed on an uncoated paper substrate which is thereafter entirely overcoated with ink.

2. Description of the Prior Art

Watermarking is a process of faintly marking a sheet of paper with a permanent indicia. Such indicia is formed into the paper web during the papermaking process. No inks, colorants or resins are used. Localized orientation of the paper fiber in the indicia pattern provides an opacity difference within the body of the paper sheet.

Traditional watermarking dates back to a time when correspondence stationery was hand formed in single sheets from small batch vessels of aqueous pulp slurry. A forming screen stretched across a framed opening included the watermark pattern as woven into the screen matrix. Since each watermark was a distinctive original and the pulping and forming such a complex process, paper sheets possessing the watermark carried an association of prestige and security. Counterfeiting a watermark was extremely difficult and rarely attempted.

In similar fashion, watermarks are formed in current, machine laid paper by the use of specialized equipment on the fourdrinier or forming table. In lieu of single sheets of watermarked paper, however, tons of watermarked paper web is produced for subsequent cutting and slitting. Simple economics, therefore, limit the availability of distinctive, individualized, watermarked paper to only the largest stationery users.

To avoid the adverse economics of a genuine, wet-laid, watermark on relatively small quantities of stationery and fine paper, the prior art developed a simulated watermark process whereby colorless solutions of solid resins are printed onto a paper web or sheet. Penetration of the paper by the resin solution alters the paper opacity to translucency. Although barely perceptable when forelighted; the simulated watermark pattern is sharp and distinct when illuminated by back light.

Independently of the paper watermarking art, well defined two-tone printing of stationery and other fine papers is a common accomplishment of the reproductive art. However, with two or more colors, some form of register control between serial color stations is normally required. Exceptions are represented by simple, single color images such as line drawings printed on a substrate of contrasting shade; for example, a black line drawing on white paper substrate.

Obviously other contrasting colors may be used in the same manner: for example, a light blue line pattern printed on a dark blue paper substrate. In this latter example, however, the pattern field, i.e. the paper substrate, is the same color on both, obverse and reverse sides. Should a precisely aligned mirror image of the pattern be desired on the substrate reverse side, controlled register equipment is a practical necessity.

Considering a permutation of the light blue line pattern printed on a dark blue field, the printer may, at a first color station, coat the obverse side of a white paper substrate with dark blue ink and at a second color station, print the light blue pattern. By this process, the substrate reverse side remains white and devoid of the obverse side pattern.

It is an object of the invention, therefore, to teach an economical process for tinting or a coloring a paper substrate in conjunction with the application of a sharply distinctive line pattern or indicia in a contrasting shade of the same basic color used for the substrate tint.

Another object of the present invention is to provide a process for two-tone image printing using but one ink color.

Another object of the present invention is to teach a two-sided, show-through printing process. On a paper substrate obverse face side, a negative type two-tone image is shown wherein the optical density of the image field is relatively greater than that of the image lines. On the substrate reverse face, the relative optical densities are exchanged for a positive image relationship.

Another object of the invention is to provide a flexographic process for reproducing a pattern printed on the obverse face of paper substrate and simultaneously producing the mirror image of the pattern on the reverse face.

SUMMARY OF THE INVENTION

These and other objects of the invention are accomplished with a two-color station flexographic press wherein the first station prints the desired image pattern or design onto an uncoated paper substrate of stationery grade with a colorless mask solution such as glycerine dissolved in a glycol ether.

Following the first print station, the second print station applies a blanket coating of ink to the entire obverse sheet side.

Those areas of the sheet being first or mask printed with glycerine solution have a different absorptive affinity for the overprinted ink and therefore reflect a different optical density, in the overprinted ink color, relative to the unmasked areas of the sheet. With solvent dye inks, this phenomenon produces a negative type image on a relatively dark field.

On the other hand, those areas of the sheet that are underprinted with glycerine solution have increased optical transparency. By discrete selection and regulation of the ink type and solvent applied in the second print station, the degree of ink show-through on the sheet reverse side may be controlled from none to moderate. Balancing the ink show-through in the non-image areas with transparency of the glycerine solution applied areas will produce a greater optical density of the ink color in the glycerine marked areas than the non-image areas on the sheet reverse side for a photographic positive result.

DESCRIPTION OF THE PREFERRED EMBODIMENT

Suitable equipment for practice of the present invention may include a two-color station flexographic press with anilox rolls. Preferably, the first print station fountain roll is equipped with a 78 Shore "A" durometer elastomer cover for pickup of the glycerine solution from the fountain pan. A 220 P (Pyramid) anilox roll surface texture used in combination with the 78 durometer fountain roll has produced good results with most mask formulations but these exact specifications are not highly critical.

The second print station in the series is unconventional in respect to the plate roll which has a smooth surface elastomer roll cover in lieu of an image plate. Suggested specifications for the plate roll cover would include a ⅛ in. thickness of natural rubber, ethylene, propylene, nitrile, vinyl or polyurethane cured to 50–55 Shore "A" durometer hardness and surface finished to about 32 f. Since the function of the second print station is to lay a continuous and uniformly dispersed blanket of ink over the obverse side of the substrate web, concentricity of the second print station plate roll and cooperative impression roll should be within 0.001 in.

In operative nip with the second print station plate roll is an engraved anilox roll having a cell count of about 180 to 220 lines per inch.

Using equipment such as that generally described above, the first print station applies the mask image to the paper substrate with an approximate 1:1 solution of a polyol such as glycerine carried in a high boiling solvent of the glycol ether genus. The solution is specifically blended to obtain a 15 to 20 second, No. 2 Zahn cup viscosity. Particularly suitable mask solution solvents for glycerine are: propylene glycol methyl ether sold as "Dowanol PM" by the Dow Chemical Co.; dipropylene glycol methyl ether sold as "Arcosolv DPM" by Arco Chemical Co.; and diethylene glycol ethyl ether sold at "Carbitol" by Union Carbide Corp. Additionaly, ethylene glycol monoethyl ether sold by Union Carbide Corp. as "Cellosolve" is technically suitable as a glycerine solvent subject to the caveat of possible toxicity to humans.

Dowanol PM has an initial boiling point of 248.2° F. Arcosolv DPM boils at 356° F. Carbitol boils 365.0° F. and Cellosolve at 275.9° F.

Another successful formulation of a mask solution has been found to include 28.6% propylene glycol methyl ether (Dowanol PM), 28.6 ethyl alcohol and 42.9% Cartaretin F-4, a proprietary cationic polyamide-amine resin product of Sandoz Colors and Chemicals Co.

A third successful formulation of mask solution comprises a 1:1 solution of 56-0600 Extender, a proprietary product of the Roberts and Carlson Co., combined with propylene glycol methyl ether (Dowanol).

Immediately following the mask image print by the first print station, the second print station applies a color blanket of uniform optical density over the entire obverse web surface area. Both, solvent based dye ink and water based pigment ink, have been used for this purpose. In the most preferred embodiment of the invention, the flexographic dye ink "Dyeflex" is used. "Dyeflex" is the proprietary fade resistent dye product of Roberts and Carlson Co. and contains 50% to 60% volatiles such as ethyl alcohol and glycol, 1% to 10% dye stuff and 30% to 40% binders.

A suitable water based ink formula contains 79.74% water, 1% menoethanolamine, 4.25% Artilene Blue 68-2-5-020, 15% Cartaretin F-4 and 0.01% Foamaster H. Monoethanolamine is a nitrogen compound of the alkanolamines family used to stabilize the mixture pH. Artilene Blue is the proprietary pigment product of Sandoz Colors and Chemicals Co. Foamaster H is a proprietary defoaming agent of the Diamond Shamrock Chemicals Co.

A commercialy suitable water based reflex ink applied over a mask image of 1:1 glycerine and "Carbitol" (Union Carbide) is the Inmont OE 607 product of the Inmont Division of United Technologies. This combination yields a positive type image on the obverse side of the substrate sheet with the masked areas darker than the field. On the sheet reverse side is a faint show-through of the mask print against the white field of the uncoated sheet for a positive, shadow image result.

In contrast to the two-sided positive image result of the water based ink example described above, a solvent dye based ink normally provides a negative image on the obverse side of the sheet substrate and a positive image on the reverse side. A representative example of this result is provided by a mask print of 1:1 glycerine and "Carbitol" (Union Carbide) overprinted with Roberts and Carlson Co. "Dyeflex" dye blended with ethyl alcohol in the proportion of 1 part "Dyeflex" to 5 parts alcohol.

Reverse side show-through, or lack of it, is normally controlled by solvent volatility of the ink, whether "slow" or "fast." The same is true concerning penetration and resultant transparency of the mask solution. Manipulation of these characteristics simultaneous with color shade and intensity provides many interesting and aesthetically pleasing combinations: all with the use of only one ink color and one image print.

Having fully disclosed our invention and the preferred embodiments thereof,

We claim:

1. A method of printing indicia on an uncoated paper substrate, said method comprising the steps of:

printing an indicia pattern on one face of said substrate with a colorless solution of polyol dissolved in a high boiling point solvent of the glycol ether genus; and, coating said indicia printed face of said substrate, including said indicia pattern, with a colored ink.

2. A method as described by claim 1 wherein said polyol is glycerine.

3. A method as described by claim 1 wherein said glycol ether solvent has a boiling point between 248° F. and 365° F.

4. A method as described by claim 3 wherein said solvent is propylene glycol methyl ether.

5. A method as described by claim 3 wherein said solvent is dipropylene glycol methyl ether.

6. A method as described by claim 3 wherein said solvent is diethylene glycol ethyl ether.

7. A method as described by claim 3 wherein said solvent is ethylene glycol monoethyl ether.

8. A method as described by claim 3 wherein said ink is a solvent based dye type.

9. A method as described by claim 3 wherein said ink is a water based pigment type.

10. The printed article product of the printing process described by claim 1.

* * * * *